United States Patent [19]

Oliver et al.

[11] Patent Number: 5,304,021
[45] Date of Patent: Apr. 19, 1994

[54] SCREW THREADED LOCKING BOLT ASSEMBLY

[75] Inventors: David J. Oliver; David P. Halliday, both of Preston, Great Britain

[73] Assignee: British Aerospace Public Limited Company, London, United Kingdom

[21] Appl. No.: 956,858

[22] Filed: Oct. 2, 1992

[30] Foreign Application Priority Data

Oct. 2, 1991 [GB] United Kingdom ............... 9120908

[51] Int. Cl.$^5$ .................... F16B 39/10; F16B 39/24
[52] U.S. Cl. .................................. 411/121; 411/136; 411/941.1
[58] Field of Search .............. 411/120, 121, 136, 149, 411/941, 941.1

[56] References Cited

U.S. PATENT DOCUMENTS

| | | |
|---|---|---|
| 793,088 | 6/1905 | Pariso .................................. 411/121 |
| 911,063 | 2/1909 | Offutt et al. ......................... 411/121 |
| 4,889,458 | 12/1989 | Taylor . | 
| 4,976,576 | 12/1990 | Mahaney, Jr. et al. ............. 411/121 |
| 5,092,194 | 3/1992 | Oliver et al. . |

FOREIGN PATENT DOCUMENTS

89/08207 9/1989 World Int. Prop. O. .......... 411/121

Primary Examiner—Neill R. Wilson
Attorney, Agent, or Firm—Cushman, Darby & Cushman

[57] ABSTRACT

Locking bolt assembly comprises a bush (9) fixed in use with respect to a structure to which a bolt of the assembly is to be engaged and a socket (1) carried on the bush (9) and provided with locking means (6) for preventing rotation of the socket (1) on the bush (9) but permitting limited longitudinal movement thereon. The bolt is threaded and has a head (3) dimensioned for rotational locking engagement within socket (1). A coil spring (7) urges the head (3) and socket (1) into rotational locking engagement. In use the socket (1) may be moved longitudinally with respect to said bush (9) against the action of the spring (7) from a position in which the head (3) and the socket (1) are radically locked, to a position in which the head (3) is freed for rotation and engagement with a co-operating nut fixed to the structure.

6 Claims, 2 Drawing Sheets

SCREW THREADED LOCKING BOLT ASSEMBLY

BACKGROUND OF THE INVENTION

This invention relates to Screw Threaded Locking Bolt assemblies, and in particular to such assemblies for holding or securing items of equipment in aircraft.

According to the invention there is provided a locking bolt assembly comprising:

bush means for axially supporting a threaded bolt of said assembly, said bush means being adapted to be fixed in use with respect to a structure to which said bolt is to be engaged;

socket means carried on said bush means and being internally dimensioned for rotational locking engagement of a head of said threaded bolt and comprising means for preventing rotation of said socket means on the bush but permitting limited longitudinal movement thereon, said head of said threaded bolt being correspondingly dimensioned for rotational locking engagement within said socket; and, resilient means for urging said head and said socket means into said rotational locking engagement, so that in use said socket means may be moved longitudinally with respect to said bush means against the action of said resilient means from a position in which said head and said socket means are radically locked, to a position in which said head is freed for rotation and engagement with a co-operating nut of said assembly fixedly mounted on said structure.

We have found our invention particularly useful in situations where the nut portion of a nut and bolt assembly for equipment installation is inaccessibly built into an aircraft structure and such that the nut per se cannot have any self-locking element in it due to the high frequency of equipment removal for maintenance purposes.

BRIEF DESCRIPTION OF THE DRAWINGS

An embodiment of the invention will now be described by way of example only and with reference to the accompanying drawings in which.

DETAILED DESCRIPTION

Figure 1:
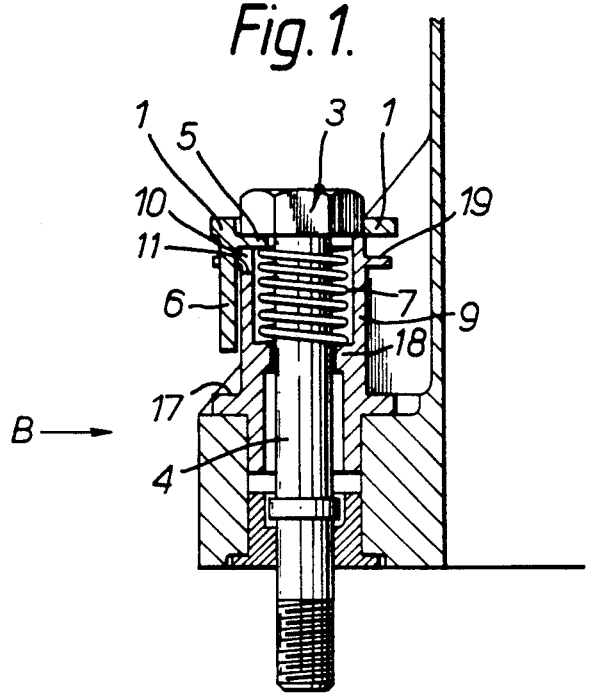
FIG. 1 is a sectional side view of a screw threaded locking bolt assembly, sectioned along the line A—A of FIG. 2, shown in a disengaged position.
Figure 2:
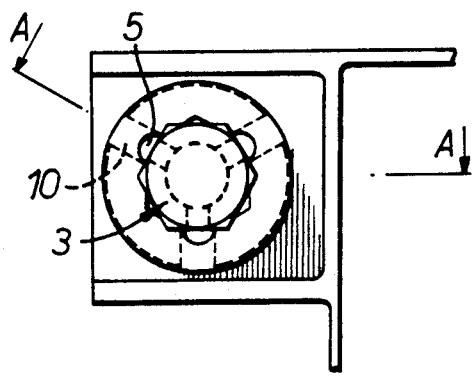
FIG. 2 is a plan view of the bolt assembly of FIG. 1.

The assembly includes a twelve point socket 1 and a hexagonally headed bolt 3 which has a diameter such that the hexagonal outer surface of the head thereof may be inserted partially into the twelve point socket 1 and relative rotation will not then be possible. Three tangs 5 are radially distributed at 120° intervals around the interior circumference of the twelve point socket 1 and three downwardly extending portions 6 are formed on the lower surface of the socket 1. Portions 6 are also radially distributed at 120° intervals around the socket 1 and at points corresponding to the locations of tangs 5.

When assembled a shaft 4 of the bolt 3 passes through the twelve point socket 1 and a helical spring 7 is positioned around the shaft 4. The top surface of the spring 7 bears against the underside of the tangs 5. A cylindrical bolt head abutment bush 9 with a circumferential flange 19 is positioned around the outer surface of spring 7. The bush is fixed with respect to the structure into which the bolt is to be threaded. The upper circumferential surface of the bush 9 is provided with three radially distributed longitudinal slots 10 spaced apart by 120° and extending through flange 19 for cooperation with portions 6 and the tangs 5 and lower down with an internal flange 18 which engages the lower surface of the spring 7. The tangs 5 extend through the slots 10 to provide the bearing surface for the top surface of the spring 7.

In the disengaged position shown in FIG. 1, the socket 1 is held against the bolt head 3 by the action of spring 7 on tangs 5. The action of the spring 7 on the tangs 5 prevents them from coming into contact with the bottom horizontal surface 11 of the slots 10 in the bush 9.

Figure 3:
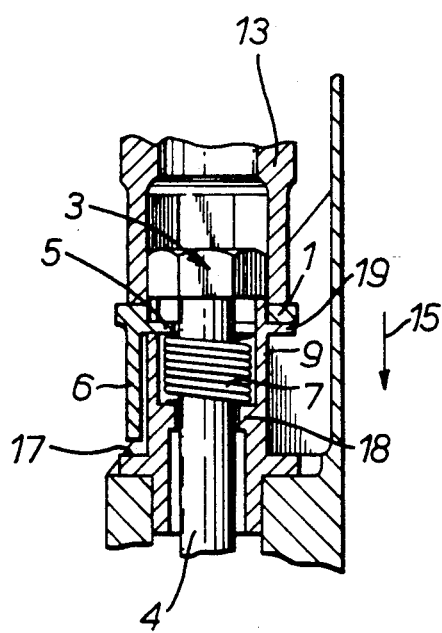
FIG. 3 is a sectioned side view of the bolt assembly of FIG. 1, sectioned along the line A—A of FIG. 2, shown in an engaged position.
Figure 4:
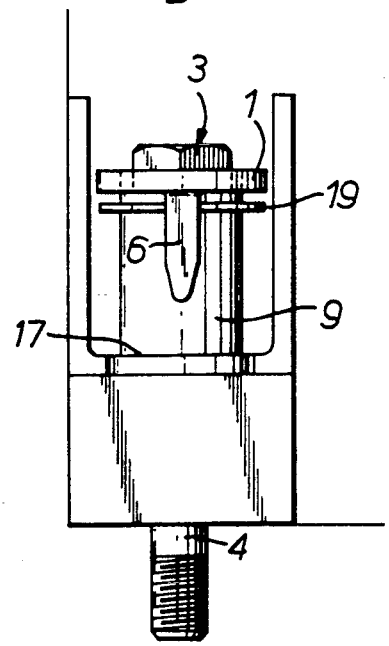
FIG. 4 is a sectional side view of the bolt assembly of FIG. 1 viewed in the direction of the arrow B shown in FIG. 1.
Figure 5:
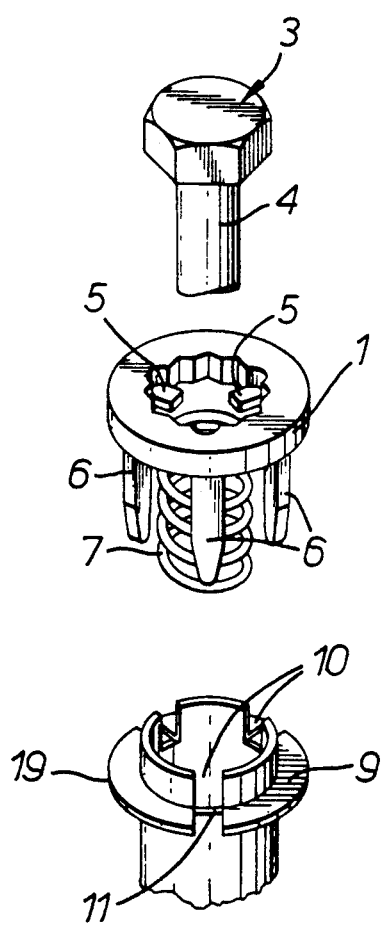
FIG. 5 is an exploded perspective view of the bolt assembly shown in FIG. 1 to 4.

As shown in FIG. 3, when a socket spanner 13 is engaged with the head of the bolt 3, and resting on the upper surface of the socket 1, the bolt and the socket may be pushed downwards in the direction of arrow 15 so that the thread (not shown) on the bolt shaft 4 engages the internal thread of the surface (not shown) into which the bolt 3 is to be attached.

The thread cannot be engaged until the tangs 5 are aligned with the slots in the bush 9. Once so aligned, downward pressure on the socket 1 allows limited vertical downward movement of the shaft 4 in which spring 7 is compressed between tangs 5 and flange 18. In the event of non-alignment the rotation of the bolt 3 caused by rotation of the socket spanner 13 will cause the tangs 5 to come into alignment with the slots 10 of the bush 9 and pass therethrough, thus enabling the thread to be engaged when downward pressure in the direction of arrow 15 is applied. This downward pressure must be sufficient to cause the twelve point socket 1 to disengage from the bolt 3 so that the bolt 3 may be rotated relative to the socket 12.

When the required torque has been achieved, which may be indicated by the portions 6 of the socket 1 coming into contact with surface 17, the downward pressure is then removed and either the bolt can be rotated up to 1/12th of a turn in the opposite direction (i.e. loosened) until the bolt head 3 re-engages in the socket 1 due to the pressure exerted by the spring 7, or the bolt 3 may be left and allowed subsequently to vibrate loose, thereby causing the bolt head 3 to engage the socket 1 in a similar way. In either case the bolt is then locked into position by the socket 1 and cannot rotate further with respect to bush 9 or the structure supporting the bush.

The bolt 3 is undone by engaging the socket spanner 13 thereon and exerting a pressure so that the bolt 3 disengages from the socket 1 due to the downward movement of the socket 1 in response to the downward pressure exerted by the socket spanner 13. Rotation of the socket spanner 13 will then cause the bolt 3 to be undone in the same way as a conventional bolt.

It will be seen that the cooperation of the portions 6 and the slots 10 prevent radial movement of the socket 1 with respect to the bush 9, whilst the depth of the slots 10 and the location of the flange 19 on the bush 9 limit the longitudinal movement of the socket 1 with respect to the bush 9 and the head of the bolt 3. Thus after tightening and removal of the socket spanner, the socket 1, bush 9 and bolt 3 are radially locked (apart from an initial possible 1/12th turn as described above).

We claim:

1. A locking bolt assembly comprising:

bush means for axially supporting a threaded bolt of said assembly, said bush means being adapted to be fixed in use with respect to a structure which said bolt is to be engaged;

socket means carried on said bush means and being internally dimensioned for rotational locking engagement of a head of said threaded bolt and comprising locking means, said locking means including at least one recess in said bush means and corresponding longitudinally extending tang means on said socket means for engagement in use with at least one recess for preventing rotation of said socket means on the bush but permitting limited longitudinal movement thereon, said head of said threaded bolt being correspondingly dimensioned for rotational locking engagement within said socket; and resilient means for urging said head and said socket means into said rotational locking engagement;

wherein said socket means may be moved longitudinally with respect to said bush means against the action of said resilient means from a position in which said head and said socket means are rotationally locked, to a position in which said head is freed for rotation and engagement with a co-operation nut of said assembly fixedly mounted on said structure.

2. A locking bolt assembly comprising:

a bush for axially supporting a threaded bolt, said bush comprising a plurality of longitudinal slots;

a socket, carried on said bush means, having a plurality of longitudinal tangs, said socket cooperably accepting a head of said bolt into a rotational locking engagement when said socket is urged onto said head;

said socket being rotationally locked and longitudinally moveable relative to said bush when said socket tang is cooperably located within said bush slot, and said socket being rotatable when said socket tang is not cooperably located within said bush slot; and spring means for urging said socket onto said head;

wherein said socket may be moved longitudinally while in said rotationally locking position relative to said bush to allow said head and said socket to be disengaged from said rotational locking engagement with said bolt head.

3. A locking bolt assembly according to claim 2, wherein said bush further comprises a flange for limiting said longitudinal movement of said socket.

4. A locking bolt assembly according to claim 3, wherein said bush flange is located in a predetermined position on said bush corresponding to a predetermined torque of said bolt due to a tension of said spring means.

5. A locking bolt assembly according to claim 2, wherein said plurality of tangs are 120 axial degrees apart.

6. A locking bolt assembly according to claim 2, wherein said head of said threaded bolt is hexagonal.

* * * * *